United States Patent
Pehker

[11] Patent Number: 5,277,097
[45] Date of Patent: Jan. 11, 1994

[54] CHAIN RAMMER

[75] Inventor: Manfred Pehker, Düsseldorf, Fed. Rep. of Germany

[73] Assignee: Rheinmetall GmbH, Düsseldorf, Fed. Rep. of Germany

[21] Appl. No.: 922,232

[22] Filed: Jul. 31, 1992

[30] Foreign Application Priority Data

Aug. 8, 1991 [DE] Fed. Rep. of Germany ....... 4126201

[51] Int. Cl.⁵ .................................. F41A 9/43
[52] U.S. Cl. ........................................ 89/47
[58] Field of Search ............................. 89/47

[56] References Cited

U.S. PATENT DOCUMENTS

| 804,243 | 11/1905 | Meigs et al. | 89/47 |
| 3,670,624 | 6/1972 | Hayes et al. | 89/47 |
| 3,727,515 | 4/1973 | Nelson et al. | 89/47 |
| 4,719,810 | 1/1988 | St. Cyr et al. | 74/89.15 |
| 4,719,840 | 1/1988 | Goodell et al. | 89/47 |

FOREIGN PATENT DOCUMENTS

| 0165497 | 12/1985 | European Pat. Off. |
| 173815 | 1/1905 | Fed. Rep. of Germany |
| 206290 | 11/1907 | Fed. Rep. of Germany |
| 217977 | 1/1909 | Fed. Rep. of Germany |
| 418690 | 10/1934 | United Kingdom |
| 1290206 | 9/1972 | United Kingdom |
| 1589702 | 5/1981 | United Kingdom |

Primary Examiner—Stephen C. Bentley
Attorney, Agent, or Firm—Spencer, Frank & Schneider

[57] ABSTRACT

A chain rammer for ammunition includes a ram head, a rammer drive including two drive wheels connectable to a rotary drive for rotating the drive wheels and two separate chain strands each being connected with the ram head and each passing through the rammer drive for being driven in one of a chain advance and chain reversal direction by a respective one of the two drive wheels. The chain strands are arranged to come into abutting relationship at the rammer drive when driven in the chain advance direction and for separating from the abutting relationship at the rammer drive when driven in the chain reversal direction. Each chain strand includes chain links having hooks arranged to grasp an oppositely disposed chain link when the strands come together at the rammer drive in the chain advance direction to establish a firm mechanical connection between the two chain strands and so that such connection is released again when the chain strands move in the chain reversal direction.

2 Claims, 2 Drawing Sheets

CHAIN RAMMER

BACKGROUND OF THE INVENTION

The present invention relates to a chain rammer for ammunition wherein two separate chain strands are connected with a ram head and are driven by respective drive wheels of a rammer drive in a chain advance and a chain reversal direction.

Chain rammers including stiff-backed ram chains have been known for a long time and are employed as a pushing device for displacing and ramming large-caliber ammunition into automatic loading systems. They are employed specifically where limited space does not permit a ram rod, for example in a tank turret.

German Patents Nos. 173,815, 206,290 and 217,977 disclose chain rammers which are composed of a link chain equipped with a ram head and a ram drive. The link chain is arranged so that movement in the direction of the rammer causes the link chain to be joined into a rigid chain strand.

Such chain rammers are of a relatively costly construction in order to give them the necessary stiffness in the chain advance direction. Due to the use of only one chain, the rammer drives must be very robust and of a space consuming design. Finally, problems have arisen in connection with lateral chain paths since sufficient rigidity of the chain is difficult to realize for such operation. As a result, the chains are generally supplied from the bottom, with the axle of the drive wheel lying parallel to the bottom plate of the tank.

In order to overcome the drawbacks of the above-mentioned rammers, it has been proposed to employ two separate chain strands connected with a ram head on the driving side of the drive mechanism. On the intake side of the drive mechanism, the two separate chain strands are guided in rails which are adapted to the spatial conditions of the environment. The stiff back of the respective chain strand is based on the specific shape of the chain links which, combined into a chain strand, permit only a bending movement in one direction until they are stretched out. On the driven side, the chain strands lie rigidly next to one another without any mechanical connection. The chains are brought in by way of rammer drive wheels arranged horizontally relative to the bottom plate of the tank, and thus generally also relative to the ground.

Such chain rammers have the drawback that during the pushing movement the chain strands tend to roll and the two chain strands drift away from one another. This drawback increases with increasing pushing force and with increasing ram path length.

SUMMARY OF THE INVENTION

It is an object of the present invention to further improve a chain rammer composed of two chain strands so that even with longer ram paths the motion sequence is more linear than in prior art rammers.

The above and other objects are accomplished according to the invention by the provision of a chain rammer for ammunition, comprising: a ram head; a rammer drive including two drive wheels connectable to a rotary drive for rotating the drive wheels; and two separate chain strands each being connected with the ram head and each passing through the rammer drive for being driven in one of a chain advance and chain reversal direction by a respective one of the two drive wheels, the chain strands being arranged to come into abutting relationship at the rammer drive when driven in the chain advance direction and for separating from the abutting relationship at the rammer drive when driven in the chain reversal direction, each chain strand including chain links having hooks arranged to grasp an oppositely disposed chain link when the strands come together at the rammer drive in the chain advance direction to establish a firm mechanical connection between the two chain strands and so that such connection is released again when the chain strands move in the chain reversal direction.

The invention is thus essentially based on the concept of connecting the chain strands with one another by the addition of buttoning hooks. For this purpose, and in accordance with a further aspect of the invention, hooks are provided at the narrow, inner chain links which partially grip around the broader, outer chain links of the opposite chain strand. A release of this connection occurs only when the ram head is being pulled back toward the rammer drive.

Further details and advantages of the invention will now be described in connection with one embodiment thereof and with the aid of drawing figures.

DESCRIPTION OF THE PREFERRED EMBODIMENT

Figure 1:
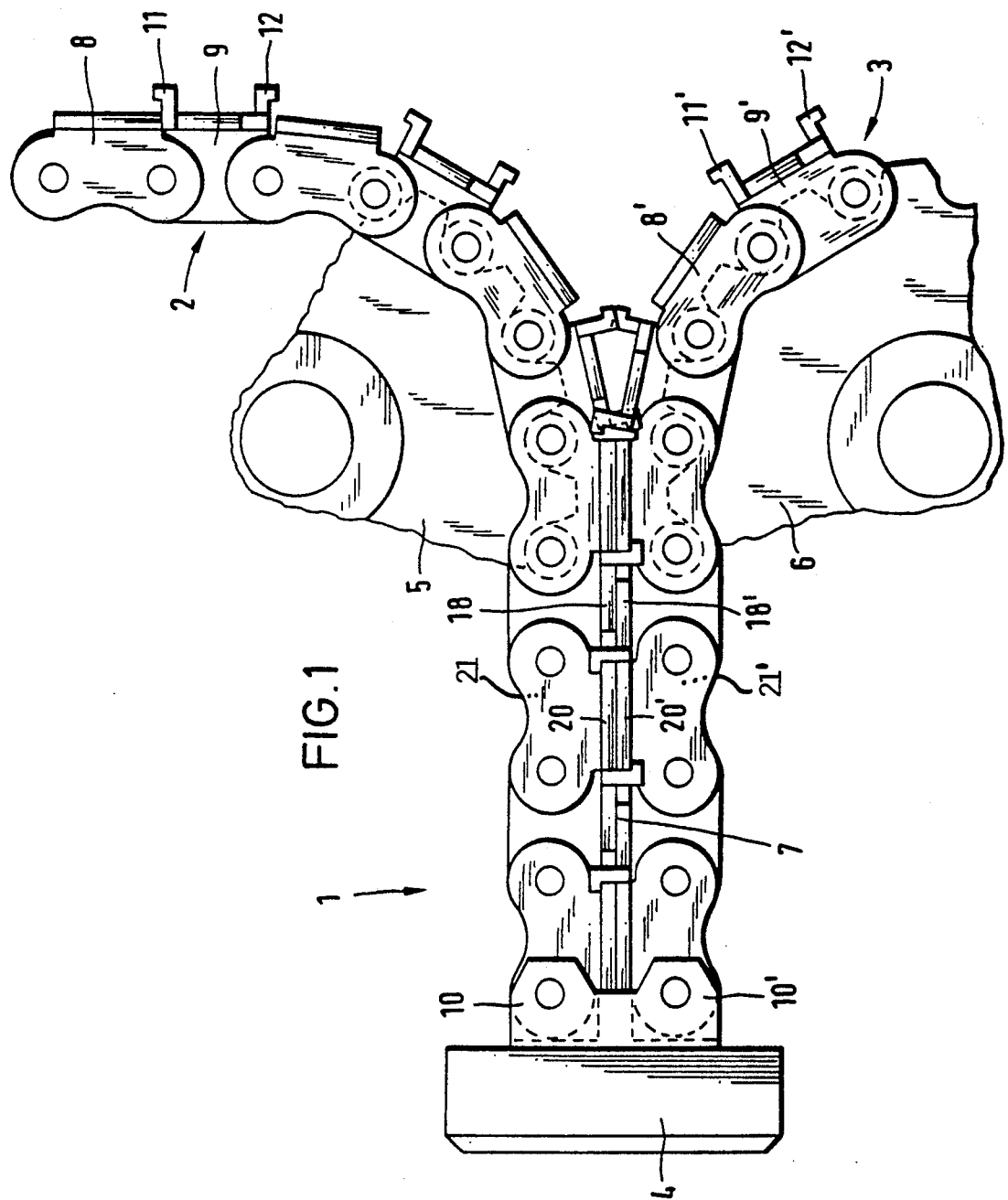
FIG. 1 is a side view of a chain rammer according to the invention.

Referring to FIG. 1, there is shown a chain rammer 1 composed essentially of a first chain strand 2, a second chain strand 3, a ram head 4 connected to the chain strands, and a partially illustrated rammer drive comprised of drive wheels 5 and 6. Drive wheels 5 and 6 are arranged, for example, parallel to a vehicle bottom (not shown). Chain strands 2 and 3 come together to form a ram strand 7.

Chain strands 2 and 3 include, respectively, outer chain links 8 and 8' and inner chain links 9 and 9'. The first chain links of each strand are fixed to ram head 4 by means of connecting members 10 and 10', respectively.

Figure 2:
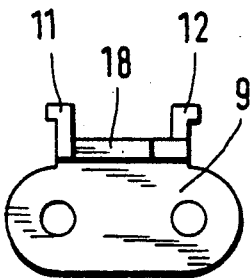
FIGS. 2 to 4 are a side view, a top view and a front view, respectively, of an inner chain link equipped with buttoning hooks.
Figure 4:
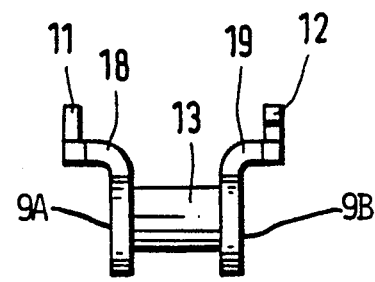
Figure 3:
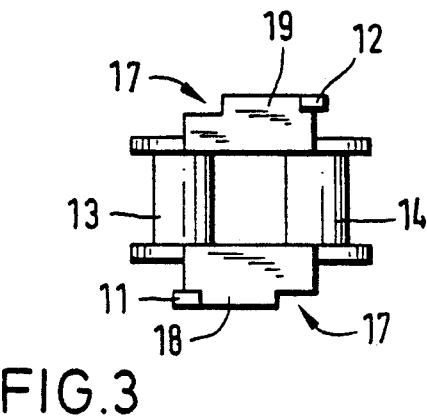

FIGS. 2 to 4 show, in accordance with the invention, the configuration of an inner chain link 9 which includes respective inner link sides 9A and 9B from which abutment faces 18 and 19 extend upwardly and outwardly. Abutment faces 18 and 19 have a rectangular configuration in the plan view as shown in FIG. 3 and buttoning hooks 11 and 12 are provided at one set of diagonal corner points thereof, with recesses 17 being provided at the remaining diagonal corner points. Inner link sides 9A and 9B are connected by sleeves 13 and 14 through which pivot pins 15 and 16 are pushed for fastening outer links 8 and 8' as discussed below and shown in FIGS. 5 to 7.

Figure 5:
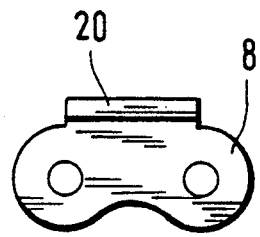
FIGS. 5 to 7 are a side view, a top view and a front view, respectively, of an outer chain link.
Figure 7:
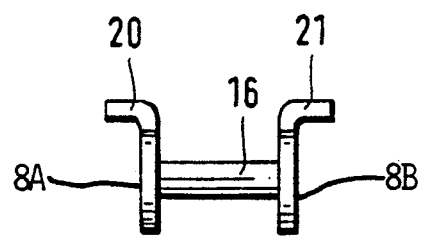
Figure 6:
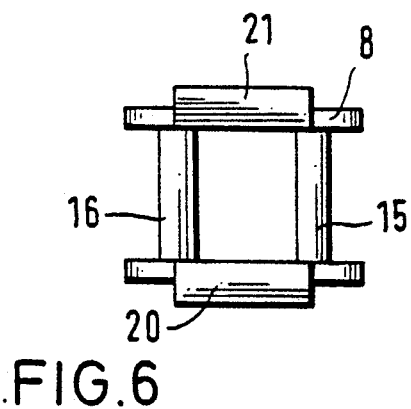

Referring to FIGS. 5 to 7, there is shown the configuration of a corresponding outer chain link 8 which includes outer link sides 8A and 8B from which abutment faces 20 and 21, respectively, extend upwardly and outwardly and which also present a rectangular configuration in the plan view as shown in FIG. 6. Pivot pins 15 and 16 connect outer link sides 8A and 8B through sleeves 13 and 14, respectively as mentioned above. The abutment faces of outer chain links 8 and 8' contact the corresponding abutment faces of the opposing inner chain links 9 and 9' and are mechanically coupled to one another to form a rigid chain strand as will be described below in connection with a discussion of the operation of the invention.

In the rest state, chain strands 2 and 3 are retracted until ram head 4 is close to drive wheels 5 and 6 of the rammer drive. During ramming of ammunition, the chain strands are pushed out of drive wheels 5 and 6 (for example, due to rotation of a non-illustrated rotational drive). This causes diagonally arranged buttoning hooks 11 and 12 of inner chain links 9 of chain strand 2 to grip through recesses 17 (see FIG. 3) in the oppositely disposed inner chain links 9' and behind abutment faces 20' and 21' of the adjacent outer chain link 8' of chain strand 3. The same applies for buttoning hooks 11' and 12' of inner links 9' of strand 3 which grip behind abutment faces 20 and 21 (see FIG. 7) of the oppositely disposed outer chain links 8 of strand 2.

As can be seen in FIG. 1, the two chain strands 2 and 3 are combined in the region between ram head 4 and drive wheels 5 and 6 to form a ram strand 7 which, together with the buttoning hooks, produces a tight mechanical connection which substantially excludes individual movement of the chain links relative to one another and thus ensures a good linear forward movement.

When chain strands 2 and 3 are pulled into the rammer drive due to rotation of drive wheels 5 and 6 in the opposite, chain reversal direction, the buttoning hooks slide out of abutment faces 20, 21 and 20' and 21' of the outer chain links 8 and 8', so that chain strands 2 and 3 which form rigid ram strand 7 are released from one another into two individual chain strands.

Obviously, numerous and additional modifications and variations of the present invention are possible in light of the above teachings. It is therefore to be understood that within the scope of the appended claims, the invention may be practiced otherwise than as specifically claimed.

What is claimed is:
1. A chain rammer for ammunition, comprising:
a ram head;
a rammer drive including two drive wheels connectable to a rotary drive for rotating said drive wheels; and
two separate chain strands each being connected with said ram head and each passing through said rammer drive for being driven in one of a chain advance and chain reversal direction by a respective one of said two drive wheels, said chain strands arranged to come into abutting relationship at said rammer drive when driven in the chain advance direction and for separating from the abutting relationship at said rammer drive when driven in the chain reversal direction, each chain strand including chain links having hooks arranged to grasp an oppositely disposed chain link when the strands come together at the rammer drive in the chain advance direction to establish a firm mechanical connection between the two chain strands and so that such connection is released again when the chain strands move in the chain reversal direction, wherein each chain strand includes alternating narrow, inner chain links and broader, outer chain links presenting abutment faces, said hooks being disposed at the narrow, inner chain links, such that during passage through the rammer drive said hooks are placed in a form locking manner around the abutment faces of respective ones of said broader, outer chain links of the oppositely disposed chain strand.

2. A chain rammer as defined in claim 1, wherein each narrow, inner chain link includes an abutment face having four corner points and two hooks disposed at diagonally oppositely disposed corner points of the abutment face of said narrow, inner chain link, and the respective two remaining corner points of the abutment face of said narrow, inner chain link have recesses through which pass corresponding hooks of the chain link of the oppositely disposed chain strand during movement of the two chain strands in the chain advance direction.

* * * * *